Patented Mar. 15, 1927.

1,621,131

UNITED STATES PATENT OFFICE.

CHARLES O. NELSON, OF GREELEY, NEBRASKA, ASSIGNOR TO UNITED FLY SALT COMPANY, OF OMAHA, NEBRASKA, A CORPORATION OF NEBRASKA.

METHOD OF TREATING LIVESTOCK.

No Drawing.   Application filed May 22, 1926.  Serial No. 111,032.

The present invention relates to improvements in the treatment of livestock to produce upon the skin thereof exudate and excretions of a nature obnoxious to insect pests and parasites, and will be fully understood from the following description thereof.

As is well known the annoyance and irritation to livestock due to the attacks of flies, ticks, and other forms of insect and parasitic life causes material deterioration in the health condition, including weight, of such livestock. As is also known, where the attacks of these parasites cause the livestock to refrain from grazing during the day and to graze at night, with resulting diminution of the grazing period and loss of natural rest, there is serious interference with the natural habits of the livestock and material reduction in the health standards thereof.

In combatting the attacks of insects upon livestock, for instance, of flies, lice, ticks, and similar parasites, on cattle, horses, sheep, etc., it has hitherto been customary to apply externally to the skin of the animal various materials obnoxious to the insects, for example, lime-sulfur and cresolic dips, oil applications, and the like. Such materials are in general obnoxious to handle, involve considerable difficulty and labor in application and are in general offensive to the livestock and to their attendants. In addition when applied externally the material is subject to displacement by weather and the movements of the animal in lying down, and other causes.

I have found that the difficulties in the use of external applications for preventing the attacks of insects such as flies, lice, etc., on animals may be avoided and an enhanced result attained by causing upon the skin of the animal an exudate or excretion obnoxious to the attacking insects and parasites to thereby relieve the animal from such attacks with resultant loss in general condition, including weight. This I have effected by the internal administration to the animals of small quantities of sulfur regularly over sustained periods of time. The sulfur is fed in conjunction with foodstuffs (under which term I include mineral foods and/or condiments such as salt) palatable to the animal; in general I prefer to feed the sulfur in admixture with salt, a suitable mixture being one containing 80 parts of salt to 15 to 20 parts of sulfur. Other constituents may be added to the mixture; for example, small proportions of hydrated lime appear to aid in the desired assimilation and metabolism of the sulfur in the body.

In feeding sulfur in accordance with this invention, it is necessary that it be regularly and continuously supplied and taken in proportion sufficient to produce and maintain the desired type of skin exudate obnoxious to insect pests. The amount ingested is approximately proportioned to the weight of the animal. Thus, a full grown cow or steer of average weight will require 0.3 to 1 pound of sulfur per month and preferably from 0.45 to 0.6 pounds. Other animals, such as horses, sheep, etc., require corresponding amounts proportioned to their weight. As above pointed out, the sulfur is administered in conjunction with a food substance palatable to the animal, as with oats, bran mashes, salt or the like. Thus, by making available to the livestock a salt-sulfur mixture in the proportions previously set forth, the amount consumed in supplying the natural requirement of the animals for salt will provide adequate quantities of sulfur to effect the result herein set forth. Substantially lower proportions of sulfur in the mixtures are inadequate unless supplemental feeding of sulfur in another way is provided.

The administration of sulfur as herein set forth is wholly unaccompanied by disturbances in the digestion or metabolism in the animal; on the contrary, an improvement in tone and health of the animal is seen; no undesirable or foreign odor or taste is found in the meat or milk from the animal, and growth and conditioning are aided by the freedom of the livestock from the disturbance and irritation due to the pests enumerated or to others indigenous to various localities.

In carrying out the invention it is necessary that the sulfur-containing food substances be fed over a period beginning three weeks to a month before the time of activity of the pests to be overcome in order to establish upon the skin of the animal the desired exudates and excretions. The feeding of the sulfur is continued in the manner herein described for a period required to maintain the excretions.

I claim:

1. The method of treating livestock to produce upon the skin thereof exudate and excretions of a nature obnoxious to insect pests and parasites, which comprises regularly and periodically supplying to such livestock sulfur in amounts proportioned to the weight of the animal corresponding to at last 0.3 pounds per month for an average full grown beef animal for a period sufficient to establish the desired type of exudate on the skin of the animal and in maintaining such exudate by a like continuous and regular supply of sulfur over the desired period.

2. The method of treating livestock to produce upon the skin thereof exudate and excretions of a nature obnoxious to insect pests and parasites, which comprises regularly and periodically supplying to such livestock sulfur in predetermined amounts approximately proportioned to the weight of the animal and sufficient to establish the desired type of exudate on the skin of the animal and in maintaining such exudate by a like continuous and regular supply of sulfur over the desired period.

3. The method of treating livestock to produce upon the skin thereof exudate and excretions of a nature obnoxious to insect pests and parasites, which comprises regularly and periodically supplying to such livestock sulfur in admixture with a foodstuff pleasing to the taste of the stock, the amount of sulfur proportioned to the weight of the animal corresponding to 0.45 to 0.6 pounds per month for an average full grown beef animal for a period sufficient to establish the desired type of exudate on the skin of the animal and in maintaining such exudate by a like continuous and regular supply of sulfur over the desired period.

CHARLES O. NELSON.